Aug. 13, 1929.  D. J. MAYER  1,724,034
RELEASABLE FRICTION LOCK FOR AFFIXING SPOOLS OR DRUMS ON ROTATABLE SPINDLES
Filed Sept. 28, 1928
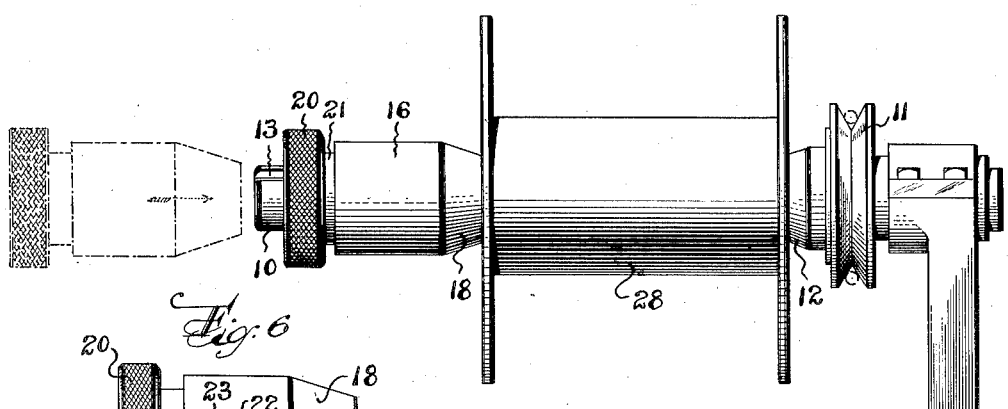
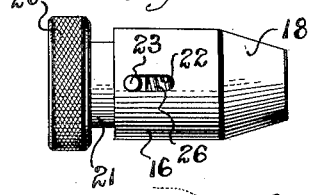
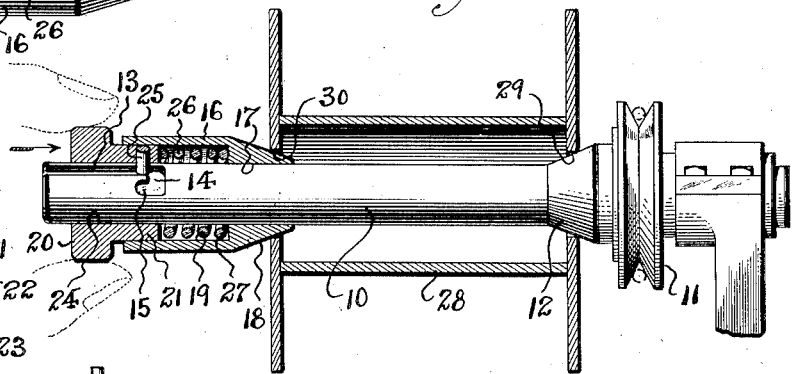
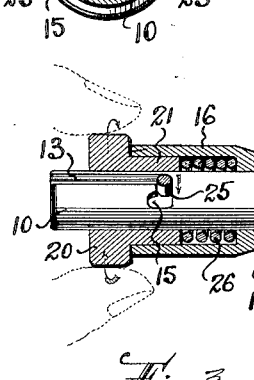
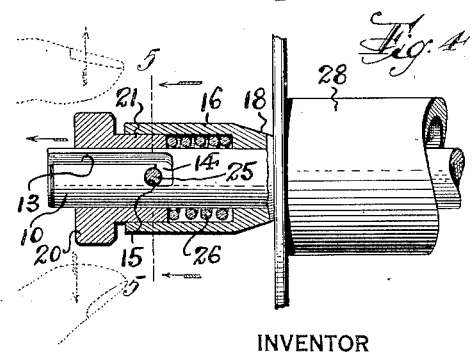
INVENTOR
Daniel J. Mayer,
BY
George D. Richards
ATTORNEY Patented Aug. 13, 1929.

1,724,034

UNITED STATES PATENT OFFICE.

DANIEL J. MAYER, OF BELLEVILLE, NEW JERSEY, ASSIGNOR TO METAL TEXTILE CORPORATION, OF WEST ORANGE, NEW JERSEY, A CORPORATION OF RHODE ISLAND.

RELEASABLE FRICTION LOCK FOR AFFIXING SPOOLS OR DRUMS ON ROTATABLE SPINDLES.

Application filed September 28, 1928. Serial No. 308,965.

This invention relates, generally, to a novel construction of releasable friction lock for affixing spools, drums or the like on rotatable spindles; and the invention has reference, more particularly, to a quickly and easily manipulatable friction lock which is self-contained and which is secure against accidental displacement from locked association with a spindle and spool or the like to be affixed upon the latter.

This invention has for its purpose to provide a compact, mechanically simple and easily manipulatable friction lock suitable for use in connection with various kinds of machines including removable spools, drums, reels or the like which it is desired to detachably affix to rotatable spindles so that the same may be driven by the latter. As an example of such machines, a wire drawing machine may be referred to. Wire drawing machines usually include a rotatable spindle to receive a spool or reel upon which the drawn wire is wound as it issues from the drawing dies; the winding being accomplished by imparting to the spool or reel the rotary motion of the spindle upon which the same is mounted. It has usually been the practice in such machines to provide the spindle with a left threaded free end to receive a holding nut by which a hub-cone is forced into holding engagement with the outer end of the spool or reel mounted on the spindle. Such means for affixing the spool or reel to the spindle is not altogether satisfactory; first, for the reason that considerable time and effort is required to manipulate the nut, and such manipulation ordinarily requires the use of tools, such as wrenches or the like; secondly the nuts sometimes become loose and fly off, thus releasing the reel or spool which in turn may be thrown off the spindle to the detriment to the content of wire wound thereon, and with risk of injury to nearby workmen; and thirdly, because in operation such form of reel or spool fastening may loosen at a critical time, so that the reel or spool fails to receive the rotary impulse of the spindle, with consequent risk of entangling wire issuing from the drawing dies.

It is, therefore, the principal object of this invention to provide a novel construction of friction lock which may be quickly and easily connected and disconnected from a spindle to hold or release a spool or reel mounted thereon; which may be directly manipulated by the hands without the use of tools; which is positively interlocked with the spindle when in holding relation to a spool or reel; and which exerts a constant pressure on the spool or reel calculated to operatively retain the latter in strong frictional union with the spindle so as to be uniformly and constantly driven by the rotation of the latter.

Other objects of this invention, not at this time more particularly enumerated, will be clearly understood from the following detailed description of the same.

The invention is clearly illustrated in the accompanying drawings, in which:—

Figure 1 is a side elevation of a rotatable spindle means having a spool or reel mounted thereon and affixed thereto by the novel releasable friction lock of this invention, the detached or released relation of the latter being shown by broken lines, and the attached operative relation thereof by full lines.

Figure 2 is a view in part side elevation and in part section, illustrating the initial operation of mounting the novel friction lock in operative relation to a spindle and spool or reel; Figures 3 and 4 are fragmentary views, similar to that of Figure 2, but respectively illustrating intermediate and final operations required to engage the lock in operative relation to spindle and spool or reel; Figure 5 is a transverse section, taken on line 5—5 in Figure 4; and Figure 6 is a side elevation of the lock, showing the side thereof opposite to that shown in Figure 1.

Similar characters of reference are employed in all of the hereinabove described views, to indicate corresponding parts.

Referring to the drawings, the reference character 10 indicates any suitably supported rotatable spindle having a driving pulley 11, or any other suitable means for imparting rotary motion thereto. Fixed on the inner end of said spindle 10, so as to rotate therewith, is a base or inner hub-cone 12. The outer end portion of said spindle 10 is provided with a bayonet groove comprising a main channel 13 entering at the extremity of the spindle and extending longitudinally inwardly along the surface thereof, a cross channel 14 extending transversely from the inner end of said main channel 13, and a lock-seat channel 15 longitudinally and outwardly offset from the opposite end of said cross channel 14.

The novel releasable friction lock, according to this invention, comprises, a cylindrical barrel 16 having a bore 17 to slidably fit said spindle 10, and having at its forward end a tapered portion to provide an outer hub-cone 18. The rearward end-portion of said barrel 16 is provided with a diametrically enlarged chamber 19 open at the rearward extremity of said barrel 16. The reference character 20 indicates a lock knob having a neck-portion 21 of reduced diameter to fit and slidably enter into the rearward open end of said chamber 19 of the barrel 16. Formed in the side wall of said barrel 16, so as to open through to the interior of said chamber 19, is a longitudinal slot 22. Fixed to said neck-portion 21 is an outwardly and laterally projecting stop-pin 23, the free end portion of which enters and extends outwardly through said slot 22. Said stop-pin 23 cooperates with the ends of said slot 22 to limit the longitudinal movement of said lock-knob 20 relative to said barrel 16. Said lock-knob and its neck-portion is provided with an axial bore 24 to fit said spindle 10 so that said lock-knob may be slidably engaged thereon with said barrel 16. Fixed to said neck-portion 21 is an inwardly projecting lock-stud 25, which extends into the bore 24 of the lock-knob, and which may be engaged in the bayonet groove of the spindle 10 when the friction lock device is applied thereto. A compression spring 26 is arranged within the chamber 19 of the barrel 16 between the inner end or shoulder 27 determining the inner end of said chamber 19 and the free end of the neck-portion 21 of said lock-knob 20. Said compression spring, by its tension, tends to thrust said lock-knob 20 outwardly or rearwardly to normal stopped position as determined by the engagement of said stop-pin 23 with the outer or rearward extremity of the slot 22 of said barrel 16 (see Figure 6), to thus hold said barrel and lock-knob against separation when detached from the spindle 10.

The reference character 28 indicates a spool or reel, which is engageable on said spindle 10, and which it is desired to affix thereto so as to be rotated thereby. The end plates of said spool or reel are provided with openings 29 and 30 to respectively receive the operative engagement of said inner base hub-cone 12 of the spindle 10 and said outer hub-cone 18 carried by the releasable friction lock.

To attach the novel friction lock upon the spindle 10 in holding relation to the spool or reel 28, the barrel 16 is slid over the end of the spindle 10 and turned to align the lock-stud 25 with the main channel 13 of the bayonet groove of said spindle. The barrel is thereupon pushed inwardly on the spindle 10, which will then extend outwardly through the bore 24 of the lock-knob, until the outer hub-cone 18 engages in the opening 30 of the spool or reel 28, the pressure thereupon exerted at the same time forcing the opening 29 at the opposite end of the spool or reel 28 into engagement with the inner base hub-cone 12. The barrel 16 now meets resistance to further inward movement, and before the lock-stud 25 has reached the inner end of the main channel 13 of the spindle's bayonet groove (see Figure 2). This resistance backs the spring 26, whereupon continued inward pressure exerted on the lock-knob permits continued inward movement of the latter against the tension of said spring 26 so that the lock-stud 25 may be moved to the end of said main channel 13 of the spindle's bayonet groove, so that by turning the lock-knob, in the direction of the arrow appearing in Figure 3, the lock-stud 25 may be carried laterally through the cross-channel 14 into alignment with the lock-seat channel 15 of the spindle's bayonet groove. When the parts are thus positioned the lock-knob is released, whereupon the tension of the spring 26 thrusts the lock-knob outwardly or rearwardly, thereby moving the lock-stud 25 into the lock-seat channel 15 (see Figure 4), and holds the same therein so that the friction lock is positively retained against displacement from the spindle 10. The lock-knob being thus retained against outward or rearward movement now serves as a base for the thrust of the spring 26 which is exerted upon the barrel 16 to thrust the same forward, whereby the outer hub-cone 18 is forced into strong frictional engagement with the outer end of the spool or reel 28 and the inner end of the latter into like frictional engagement with the base hub-cone 12, thereby interlocking the spool or reel 28 in frictionally bound relation to the spindle 10 so as to receive the rotary motion of the latter.

It will be obvious that a reversal of the above described operations will release the friction lock from the spindle and spool or reel, it being necessary to merely push inward the lock-knob and then turn the same to carry the lock-stud 25 out of the lock-seat 15 and through the cross-channel 14 into the main channel 13 of the spindle bayonet groove, whereupon the whole device may be slipped outwardly and off of the spindle.

From the above description it will be obvious that the novel friction lock device of this invention is of a simple self-contained construction, and of a character rendering the same easily and quickly manipulatable for connection with or removal from a spool or reel carrying spindle, while at the same time, when in operative relation to the spindle, it is calculated to exert a strong frictional binding effect upon the spool or reel, whereby the latter may be rotated by and with the spindle.

It will also be obvious that the novel releasable friction lock is capable of use in many mechanical combinations as a quickly applicable and detachable holding device, and is not to be considered as limited in use to spool or reel carrying spindles.

As many changes could be made in the above described construction and many apparently widely different embodiments of this invention could be made without departing from the scope thereof, it is intended that all matter contained in the above description or shown in the accompanying drawings shall be interpreted as illustrative and not in a limiting sense.

I claim:—

1. The combination with a spindle having a bayonet groove in its free end portion, of a spool removably engaged on said spindle, and a lock means releasably engageable with the free end portion of said spindle, said lock means comprising a lock-knob having a lock-stud engageable in said bayonet groove, means movably related to said lock-knob to engage and hold said spool, and spring means intermediate said latter means and said lock-knob, said spring means being brought under compression to actuate said spool engaging and holding means when the lock-stud of said lock-knob is moved into locked engagement with the bayonet groove of said spindle.

2. The combination with a spindle having a bayonet groove in its free end portion, of a spool removably engaged on said spindle, said spindle having a fixed hub-cone to engage one end of said spool, and a lock means releasably engageable with the free end portion of said spindle, said lock means comprising a lock-knob having a lock-stud engageable, in said bayonet groove, a hub-cone movably related to said lock knob and adapted to engage the opposite end of said spool, and spring means intermediate said movable hub-cone and said lock-knob adapted to be brought under hub-cone actuating compression when the lock-stud of said lock-knob is moved into locked engagement with the bayonet groove of said spindle.

3. The combination with a spindle having at its free end a bayonet groove terminating at its inner end in a laterally off-set lock seat, of a spool removably engaged on said spindle, said spindle having a fixed hub-cone to engage one end of said spool, a lock knob having a lock stud movable through said bayonet groove into engaged relation to said lock seat thereof, a movable hub-cone to engage the opposite end of said spool, said movable hub-cone having a chambered rear end longitudinally slidable relative to said lock knob, means to limit the movements of said lock knob and movable hub-cone in relation one to the other, and a compression spring intermediate said lock knob and movable hub-cone adapted to be brought under hub-cone actuating compression when said lock knob is locked on said spindle.

4. In a device of the kind described, a spindle having at its free end portion a bayonet groove terminating at its inner end in a laterally off-set lock seat, a spool removably engaged on said spindle, a lock means telescopically engageable over the free end of said spindle, said lock means comprising a barrel having a chambered rear end, a lock knob entering the chambered end of said barrel and capable of axial movement relative thereto, a compression spring in said chambered barrel tending to normally thrust said barrel and lock-knob in respectively opposite directions, means at the free end of said barrel to engage and hold said spool, a lock stud carried by said lock knob engageable in said bayonet groove of said spindle and movable against the comprssion of said spring into the lock seat of said groove, whereby said lock-knob is held against displacement from said spindle and the tension of said spring thereupon exerted against said barrel to maintain the same in holding engagement with said spool.

5. In a device of the kind described, a spindle having at its free end portion a bayonet groove terminating at its inner end in a laterally off-set lock seat, a spool removably engaged on said spindle, said spindle having a fixed inner hub-cone to engage the inner end of said spool, a lock means telescopically engageable over the free end of said spindle, said lock means comprising a barrel having a chambered rear end, an outer hub-cone at the forward end of said barrel engageable with the outer end of said spool, a lock-knob entering the chambered end of said barrel and capable of axial movement relative thereto, means to limit the relative movements of said barrel and lock-knob, a compression spring in said chambered barrel tending to normally thrust said barrel and lock-knob in respectively opposite directions, a lock stud carried by said lock knob engageable in said bayonet groove of said spindle and movable against the compression of said spring into the lock seat of said groove, whereby said lock-knob is held against displacement from said spindle and the tension of said spring thereupon exerted against said barrel to maintain the hub-cone thereof in holding engagement with said spool.

In testimony, that I claim the invention set forth above I have hereunto set my hand this 22nd day of September, 1928.

DANIEL J. MAYER.